(12) United States Patent
Yoshiya

(10) Patent No.: US 8,386,804 B2
(45) Date of Patent: Feb. 26, 2013

(54) SEMICONDUCTOR INTEGRATED DEVICE AND METHOD OF TESTING SEMICONDUCTOR INTEGRATED DEVICE

(75) Inventor: Fumio Yoshiya, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1052 days.

(21) Appl. No.: 12/369,699

(22) Filed: Feb. 11, 2009

(65) Prior Publication Data
US 2009/0300371 A1 Dec. 3, 2009

(30) Foreign Application Priority Data
May 28, 2008 (JP) .................................. 2008-140037

(51) Int. Cl.
*G06F 11/30* (2006.01)
*G06F 7/02* (2006.01)

(52) U.S. Cl. ....................................... 713/193; 714/819

(58) Field of Classification Search .................. 713/193; 714/E11.002, 819
See application file for complete search history.

(56) References Cited

U.S. PATENT DOCUMENTS

| 6,316,959 B1 | 11/2001 | Onodera |
| 6,490,685 B1 | 12/2002 | Nakamura |
| 2004/0111655 A1 | 6/2004 | Watanabe |
| 2004/0153801 A1 | 8/2004 | Kayukawa et al. |
| 2005/0172190 A1* | 8/2005 | Liang ............................ 714/726 |
| 2008/0010570 A1 | 1/2008 | Yamazaki |
| 2008/0307280 A1* | 12/2008 | Putman et al. ................ 714/727 |
| 2009/0070577 A1* | 3/2009 | Tkacik et al. ................. 713/100 |

FOREIGN PATENT DOCUMENTS
JP 2004-117029 4/2004

* cited by examiner

*Primary Examiner* — Nathan Flynn
*Assistant Examiner* — Abdullah Almamun
(74) *Attorney, Agent, or Firm* — Finnegan, Henderson, Farabow, Garrett & Dunner, L.L.P.

(57) ABSTRACT

According to one embodiment, a semiconductor integrated device which stores secret data and is capable of operating in a test mode in which a scan test with respect to an internal circuit is executed, the semiconductor integrated device comprises a mode signal receiving module configured to receive a scan mode signal designating the test mode, a mask module configured to mask the secret data when the mode signal receiving module receives the scan mode signal, and an error detection module configured to detect presence or absence of error in the secret data and to store detection result in a first flip-flop.

18 Claims, 2 Drawing Sheets

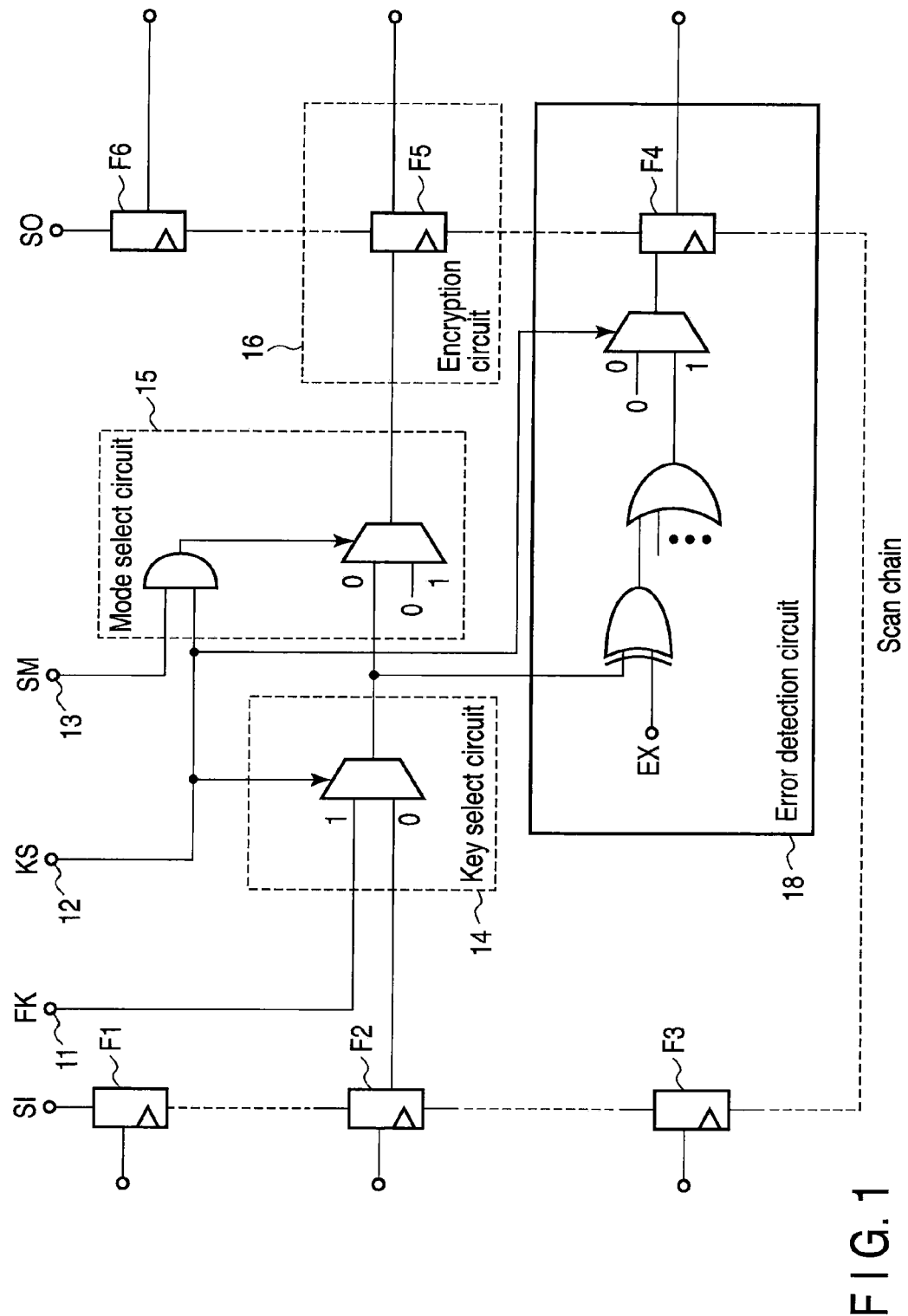
F I G. 1

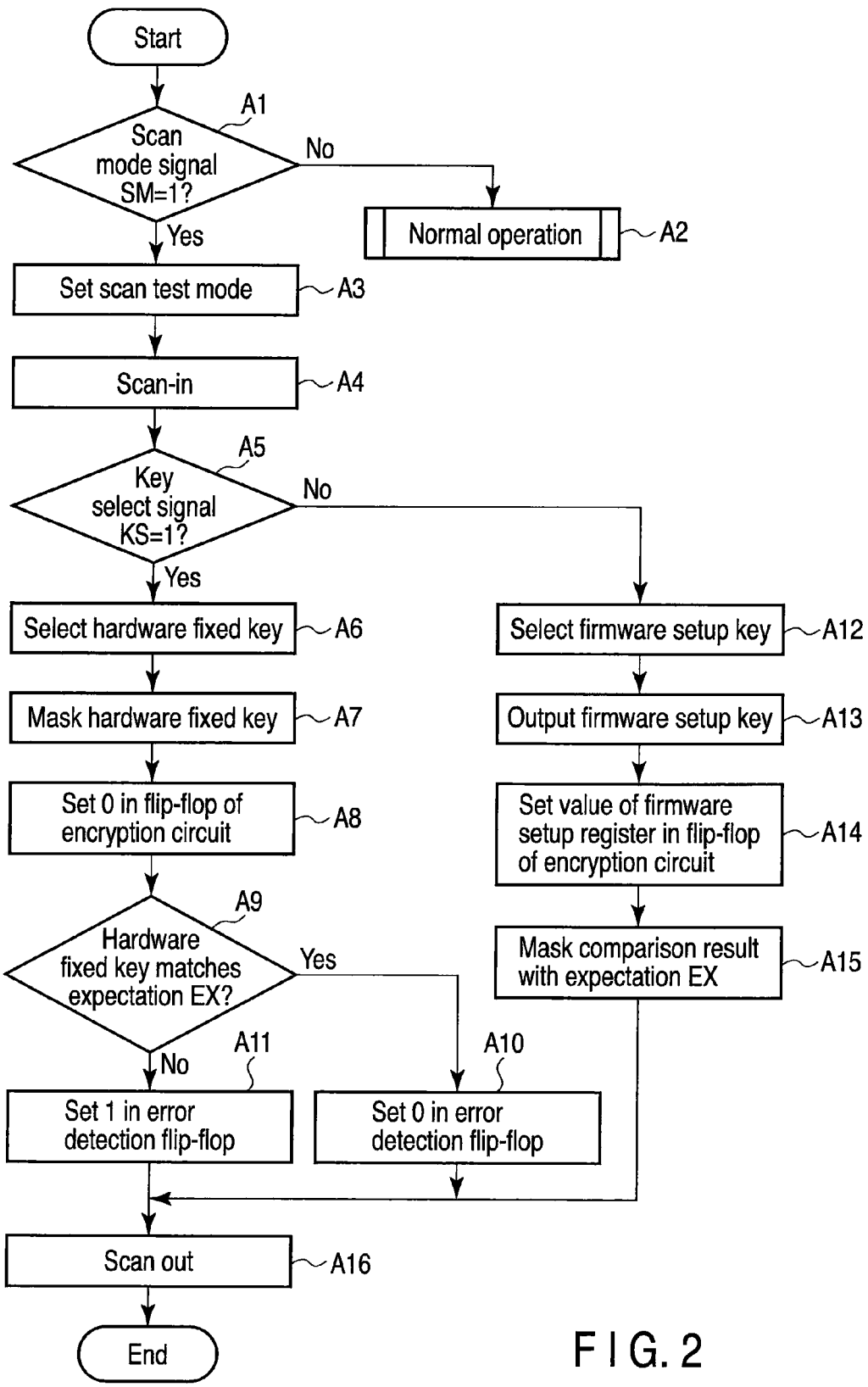
F I G. 2

SEMICONDUCTOR INTEGRATED DEVICE
AND METHOD OF TESTING
SEMICONDUCTOR INTEGRATED DEVICE

CROSS-REFERENCE TO RELATED
APPLICATIONS

This application is based upon and claims the benefit of priority from Japanese Patent Application No. 2008-140037, filed May 28, 2008, the entire contents of which are incorporated herein by reference.

BACKGROUND

1. Field

One embodiment of the invention relates to a semiconductor integrated device and a method of testing a semiconductor integrated device.

2. Description of the Related Art

Conventionally, a testing method such as a scan test has been known as a method of testing whether a manufactured LSI operates normally. According to the scan test, flip-flops (FF) in a circuit are connected like a chain to form a scan chain. A scan data pattern is input from a scan input terminal (scan-in). The input data is processed in an internal circuit, and resulting data is output from a scan output terminal (scan-out). The resulting output is observed, and thereby, it is possible to detect a defective portion of the LSI.

Jpn. Pat. Appln. KOKAI Publication No. 2004-117029 discloses a semiconductor integrated circuit and a method of testing the semiconductor integrated circuit which provides a scan test without reducing security. According to the above scan test, based on a rise edge of a scan mode signal, a value set in a flip-flop is reset when a scan mode is set, and the inside of the LSI is initialized. Therefore, data held during normal operation can not be shifted out, and security data such as encryption key is prevented from being leaked.

In the above scan test, when the scan mode is set, the inside of the LSI is initialized and the security data is made unusable, and thus, reveal of the security data to the exterior is prevented.

For example, in the case where the security data such as encryption key is hardware-implemented, whether the encryption key functions normally or not may be tested using the encryption key itself. However, in the above scan test, as the security data such as encryption key is made unusable, it is not possible to carry out the scan test safely using the security data.

BRIEF DESCRIPTION OF THE SEVERAL
VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary view showing a circuit configuration of an LSI according to an embodiment of a semiconductor integrated device of the present invention; and FIG. 2 is an exemplary flowchart showing operation of a scan test executed within an internal circuit of the LSI.

DETAILED DESCRIPTION

Various embodiments according to the invention will be described hereinafter with reference to the accompanying drawings. In general, according to one embodiment of the invention, a semiconductor integrated device, which stores secret data and is capable of operating in a test mode in which a scan test with respect to an internal circuit is executed, comprises a mode signal receiving module configured to receive a scan mode signal designating the test mode, a mask module configured to mask the secret data when the mode signal receiving module receives the scan mode signal, and an error detection module configured to detect presence or absence of an error in the secret data and to store detection result in a first flip-flop.

FIG. 1 is an exemplary view showing a circuit configuration of an LSI according to an embodiment of a semiconductor integrated device of the present invention. In FIG. 1, only components necessary for explanation of the embodiment are illustrated, and other components are omitted. That is, FIG. 1 shows an internal circuit to be targeted for a scan test according to the present embodiment and a scan chain used for the scan test.

The LSI is provided with a scan-in terminal SI and a scan-out terminal SO. Between the scan-in terminal SI and the scan-out terminal SO, scan flip-flops F1 to F6 form a scan chain. Six flip-flops F1 to F6 are illustrated in FIG. 1; however, the scan chain may contain more additional flip-flops.

When performing a scan test, test data (scan pattern) is input from the scan-in terminal SI. Then, the data to be observed is output from the scan-out terminal SO by the shift-out of the scan chain.

An encryption key FK (hardware fixed key) which is unique to and implemented in hardware of the LSI is input to an input terminal 11. In a firmware setting register F2, an arbitrary encryption key (firmware setup key) can be set by firmware. The firmware setting register F2 is incorporated in the scan chain.

Which of the hardware fixed key and the firmware fixed key will be used can be selected by firmware. A key select signal KS for selecting an encryption key is input to an input terminal 12. A key select circuit 14 switches the encryption key to be used based on the key select signal KS. When the key select signal "KS=1" is input, the hardware fixed key is selected. When the key select signal "KS=0" is input, the firmware fixed key is selected.

A scan mode signal SM is input to an input terminal 13. The scan mode signal SM makes a switchover between a normal operation and a scan test operation in the LSI. When the scan mode signal "SM=1" is input, a scan test mode is set. When the scan mode signal "SM=0" is input, a normal operation mode is set.

A mode select circuit 15 transfers the encryption key output from the key select circuit 14 to an encryption circuit 16 when the normal operation mode is set. The encryption circuit 16 carries out encryption using the transferred encryption key. The details of the encryption circuit 16 are omitted in FIG. 1 for the sake of simplicity; however, flip-flop F5 in the encryption circuit 16 is incorporated in the scan chain.

If the hardware fixed key is transferred to the encryption circuit 16 while the scan operation is being carried out, the hardware fixed key may be output to the exterior through the scan chain. Since the hardware fixed key is inherent to the LSI and implemented in hardware, the hardware fixed key cannot be reset. Therefore, if the hardware fixed key leaks out to the exterior, the security of encryption using the hardware fixed key will not be maintained anymore. Thus, the scan test needs to be executed so that the hardware fixed key will not leak outside.

In the present embodiment, when the scan test mode is set and the hardware fixed key is selected, the mode select circuit 15 masks an output value from the key select circuit 14. Thus, the hardware fixed key is prevented from being input to the encryption circuit 16. The hardware fixed key output from the key select circuit 14 is supplied to an error detection circuit 18.

The firmware setup key which is set by firmware is rewritable. Therefore, the firmware setup key is not masked in the present embodiment. When the scan test mode is set and the firmware setup key is selected, the firmware setup key set in firmware setting register F2 is sent to the encryption circuit 16, and then set in flip-flop F5. In addition, the firmware setup key output from the key select circuit 14 is also sent to the error detection circuit 18.

Though the details of the error detection circuit 18 are omitted in FIG. 1, the error detection circuit 18 compares output from the key select circuit 14 with expectation EX of the hardware fixed key.

When the hardware fixed key is selected in accordance with the key select signal KS=1, a comparison is made between the hardware fixed key and the expectation EX. As a result, when the hardware fixed key does not match the expectation EX, an error in the hardware fixed key (or an error in a transfer path of the hardware fixed key: input terminal 11→key select circuit 14) is detected. Then, "1" is set in an error detection flip-flop F4. When the hardware fixed key matches the expectation EX, "0" is set in error detection flip-flop F4. Although flip-flop F4 is incorporated in the scan chain, not the encryption key itself but only the comparison result is set in flip-flop F4. Therefore, the encryption key will not be output to the exterior through the scan chain.

Conversely, when the firmware setup key is selected, the comparison result between the firmware setup key and the expectation EX is masked. Error detection flip-flop F4 always has the same value regardless of whether the firmware setup key matches the expectation EX or not. Therefore, the hardware fixed key cannot be estimated from values of firmware setup register F2 and error detection flip-flop F4 output outside via the scan chain.

Subsequently, operation of an internal circuit of the LSI shown in FIG. 1 will be described. FIG. 2 is an exemplary flowchart showing operation of the scan test executed within the internal circuit of the LSI.

First, the value of the scan mode signal SM input to the input terminal 13 is checked (block A1). When the input scan mode signal is SM=0 (No in block A1), a normal operation mode is set and the LSI is normally operated (block A2).

On the other hand, when the input scan mode signal is SM=1 (Yes in block A1), a scan test mode is set (block A3). Then, values of flip-flops on the scan chain are set in accordance with a scan test pattern input (scan-in) from the scan-in terminal SI (block A4).

Subsequently, the value of the key select signal KS input to the input terminal 12 is checked (block A5). When the key select signal KS=1 is input (Yes in block A5), the key select circuit 14 selects the hardware fixed key as the encryption key (block A6). That is, the key select circuit 14 outputs the hardware fixed key.

In the case in which the hardware fixed key is selected, the mode select circuit 15 masks the output from the key select circuit 14 (block A7). In addition, "0" is set in flip-flop F5 of the encryption circuit 16 (block A8).

The hardware fixed key output from the key select circuit 14 is supplied to the error detection circuit 18. The error detection circuit 18 determines whether or not the hardware fixed key output from the key select circuit 14 coincides with the expectation EX (block A9).

When the hardware fixed key matches the expectation EX (Yes in block A9), it is considered that no error occurs in the hardware fixed key; thus, "0" is set in error detection flip-flop F4 (block A10). When the hardware fixed key does not coincide with the expectation EX (No in block A9), it is determined that an error has been occurred; thus, "1" is set in flip-flop F4 (block A11).

When the key select signal KS=0 is input (No in block A5), the key select circuit 14 selects the firmware setup key as the encryption key (block A12). The key select circuit 14 outputs the firmware setup key which is set in firmware setup register F2 (block A13). The firmware setup key is supplied to the encryption circuit 16, and then set in flip-flop F5 (block A14). The firmware setup key is also supplied to the error detection circuit 18; however, the comparison result with the expectation EX is masked (block A15).

Values of flip-flops on the scan chain set in the manner described above are output (scan-out) from the scan-out terminal SO (block A16). Then, observation can be made.

With reference to the flowchart, described is only the setting of test result in flip-flops F5 and F6 relating to the scan test of this embodiment. The explanation about other flip-fops included in the scan chain is omitted for the sake of simplicity.

As described above, values set in flip-flops on the scan chain are scanned out, and thus, the scan test of the LSI can be carried out. As the result of the scan-out, when "1" is set in error detection flip-flop F4, it can be found out that an error occurs in the hardware fixed key. Therefore, a manufacture error of the LSI is detectable.

When the scan test mode is set (SM=1) and the hardware fixed key is selected (KS=1), the output from the key select circuit 14 is masked and the output is not propagated to the encryption circuit 16. In this case, to be set in error detection flip-flop F4 is the determination result of whether or not an error occurs in the hardware fixed key, but not the hardware fixed key itself. Therefore, the hardware fixed key is prevented from being output outside during the scan test.

Error detection flip-flop F4 is inserted in the scan chain. Thus, when the scan mode signal "SM=1" and the key select signal "KS=1" are input, a test result of a path from the input terminal 11, to which the hardware fixed key is input, to the key select circuit 14 can be detected.

On the other hand, when the scan test mode is set (SM=1) and the firmware setup key is selected (KS=0), the value which is set in firmware setup register F2 is also set in flip-flop F5 of the encryption circuit 16. As firmware setup register F2 and flip-flop F5 are inserted in the scan chain, the scan-out result from the flip-flops F2 and F5 can be observed the values set in flip-flops F2 and F5 are compared with each other. Accordingly, testing whether the firmware setup key and the transfer path of the firmware setup key operate normally or not can be detected. That is, it can be tested whether a path from the firmware setup register F2 to the key select circuit 14 and a path from the key select circuit 14 to the mode select circuit 15 and the encryption circuit 16 operate normally or not.

The scan test according to the present embodiment prevents a malicious user from obtaining secret data loaded in the LSI, and thus, the secret data will not be revealed.

In the present embodiment, described by way of example is preventing leakage of the secret data, i.e., the hardware fixed key which is implemented in hardware. However, the secret data to be prevented from leakage is not limited to the encryption key. As in the scan test of the present embodiment, data desired to be prevented from leakage is compared with expectation thereof and only the comparison result is set in a flip-flop, and thereby, the secret data is prevented from being leaked.

In the present embodiment, the hardware fixed key, which is unique to the LSI and implemented in hardware, and the firmware setup key, which is set by firmware, can be switched. However, it can be configured so that only the hardware fixed key may be used. Alternatively, it can be configured so that only the firmware setup key may be used.

In the present embodiment, the firmware setup key is sent to the encryption circuit 16 without being masked. However, the firmware setup key may be masked similarly to the hardware fixed key. In the error detection circuit 18, the firmware setup key may be compared with expectation of the firmware setup key (the expectation may be set in prior using firmware). Also in this case, the comparison result is set in flip-flop F4 and an error in the firmware setup key or the transfer path can be detected.

When the key select signal is KS=0 and the firmware setup key is selected, since the comparison result is masked, a constant value is always set in flip-flop F4 of the error detection circuit 18. The constant value may be set even when a comparison with the expectation is not executed. Therefore, when the key select signal is KS=0, the firmware setup key is not necessarily supplied to the error detection circuit 18.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The various modules of the systems described herein can be implemented as software applications, hardware and/or software modules, or components on one or more computers, such as servers. While the various modules are illustrated separately, they may share some or all of the same underlying logic or code.

What is claimed is:

1. A semiconductor integrated device for storing secret data and capable of operating in a test mode in which a scan test with respect to an internal circuit is executed, the semiconductor integrated device comprising: a mode signal receiving module configured to receive a scan mode signal designating the test mode; a mask module configured to mask the secret data when the mode signal receiving module receives the scan mode signal; and an error detection module configured to detect presence or absence of an error in the secret data and to store detection result in a first flip-flop;
wherein the secret data comprises a first encryption key implemented in hardware and a second encryption key set by firmware; and the mask module is configured to mask the first encryption key.

2. The semiconductor integrated device of claim 1, wherein:
the error detection module compares the secret data with expectation of the secret data;
the expectation being settable; and
the error detection module stores comparison result in the first flip-flop.

3. The semiconductor integrated device of claim 2, wherein:
the secret data comprises a first encryption key implemented in hardware of the semiconductor integrated device; and
the error detection module compares the first encryption key with expectation of the first encryption key, the expectation of the first encryption key being implemented in hardware.

4. The semiconductor integrated device of claim 3, further comprising an encryption module, wherein the mask module is configured to prevent the first encryption key from being input to the encryption circuit.

5. The semiconductor integrated device of claim 4, wherein:
the secret data comprises the first encryption key implemented in hardware and a second encryption key set by firmware; and
the semiconductor integrated device further comprising a select signal receiving module (12) configured to receive a key select signal selectively designating one of the first and second encryption keys; and
wherein the mask module is configured to, when the key select signal designates the first encryption key, prevent the first encryption key from being input to the encryption circuit, and when the key select signal designates the second encryption key, the mask module does not mask the second encryption key allowing the second encryption key to be input to the encryption circuit.

6. The semiconductor integrated device of claim 5, wherein:
the encryption circuit comprises a second flip-flop;
the second encryption key input to the encryption circuit is set in the second flip-flop; and
the first and second flip-flops are incorporated in a scan chain for the scan test.

7. The semiconductor integrated device of claim 1, wherein the mask module does not mask the second encryption key.

8. The semiconductor integrated device of claim 7, further comprising a scan chain comprising flip-flops comprising a firmware settable flip-flop, the second encryption key being set in the firmware settable flip-flop.

9. The semiconductor integrated device of claim 8, wherein the scan chain comprises the first flip-flop.

10. A method of testing a semiconductor integrated device for storing secret data and capable of operating in a test mode in which a scan test with respect to an internal circuit is executed, the method comprising: receiving a scan mode signal designating the test mode; masking the secret data when the scan mode signal is received; detecting presence or absence of an error in the secret data; and storing result of detecting in a first flip-flop;
wherein the secret data comprises a first encryption key implemented in hardware and a second encryption key set by firmware; and the masking comprising masking the first encryption key.

11. The method of claim 10, wherein detecting presence or absence of error comprises comparing the secret data with expectation of the secret data, the expectation being settable, and a comparison result is stored in the first flip-flop.

12. The method of claim 11, wherein:
the secret data comprises a first encryption key implemented in hardware of the semiconductor integrated device; and
detecting presence or absence of error comprises comparing the first encryption key with expectation of the first encryption key, the expectation of the first encryption key being implemented in hardware.

13. The method of claim 12, the semiconductor integrated device further comprising an encryption circuit, wherein masking the secret data comprises preventing the first encryption key from being input to the encryption circuit.

14. The method of claim 13, wherein:
the secret data comprises the first encryption key implemented in hardware and a second encryption key set by firmware; and
the method further comprises receiving a key select signal selectively designating one of the first and second encryption keys,
wherein masking the secret data comprises preventing, when the key select signal designates the first encryption key, the first encryption key from being input to the encryption circuit and not masking, when the key select signal designates the second encryption key, the second encryption key allowing the second encryption key to be input to the encryption circuit.

15. The method of claim 14, wherein:
the encryption circuit includes a second flip-flop;
the second encryption key input to the encryption circuit is set in the second flip-flop; and
the first and second flip-flops are incorporated in a scan chain for the scan test.

16. The method of claim 10, wherein the masking comprises nom-masking the second encryption key.

17. The method of claim 16, wherein the second encryption key is set in a firmware settable flip-flop included in flip-flops forming a scan chain.

18. The method of claim 17, wherein the scan chain comprises the first flip-flop.

* * * * *